June 15, 1954     G. B. SCHLEICHER     2,681,436
TRANSFORMER-LOSS COMPENSATOR MEASURING DEVICE
Filed Nov. 30, 1949                                               4 Sheets-Sheet 1
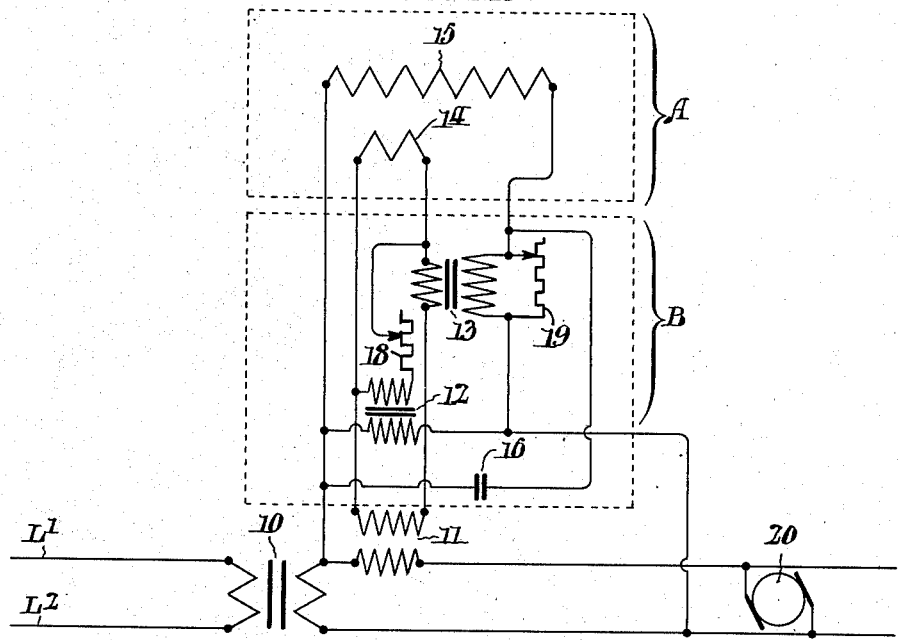
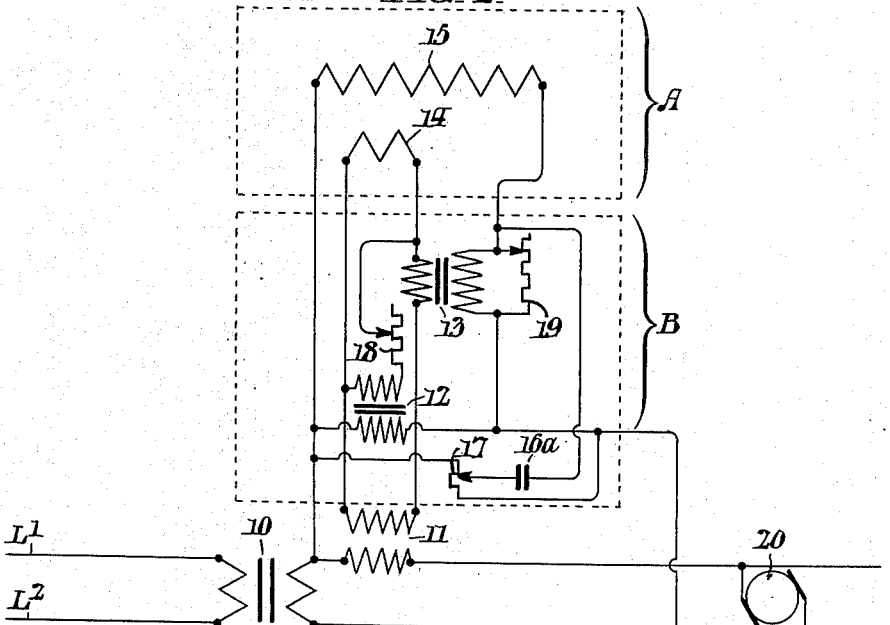
WITNESSES                                        INVENTOR:
                                                 George B. Schleicher.
                                         BY
                                                        ATTORNEYS.

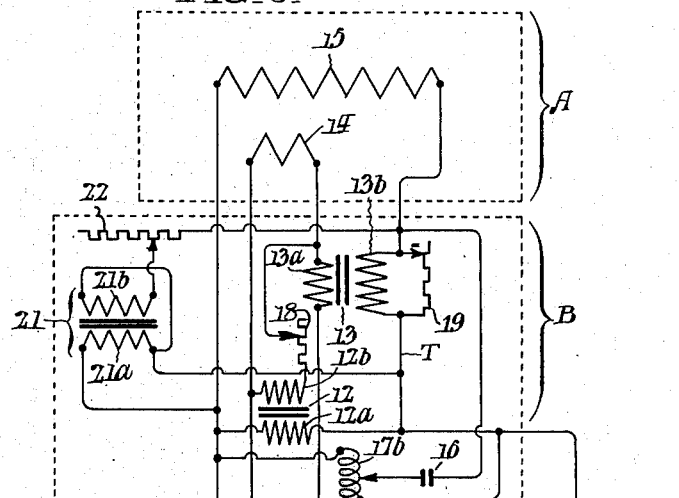
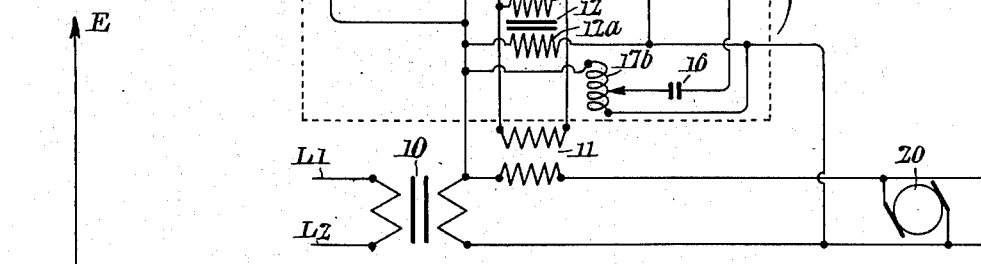
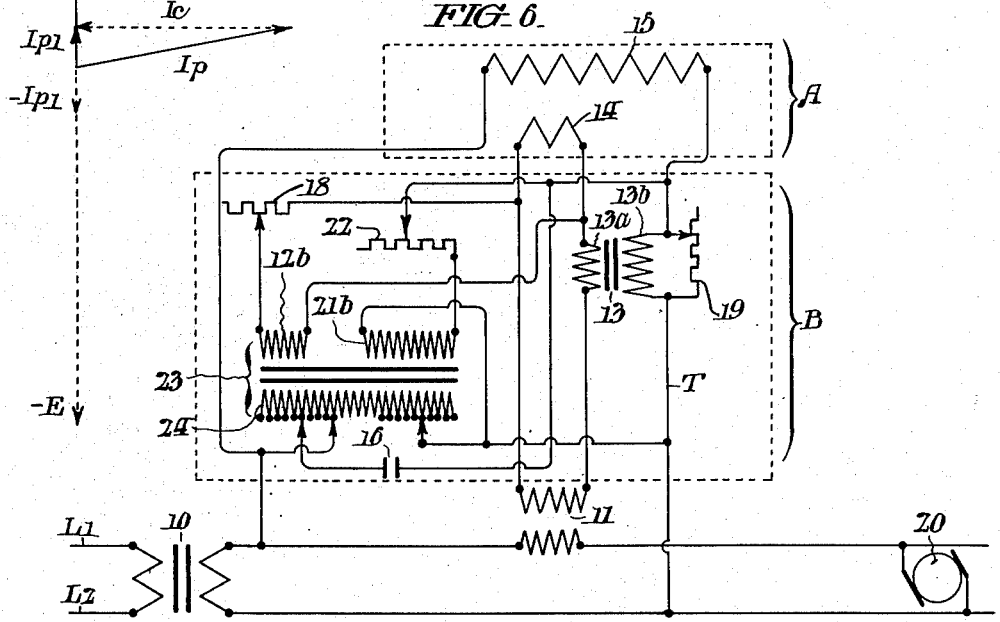

June 15, 1954   G. B. SCHLEICHER   2,681,436
TRANSFORMER-LOSS COMPENSATOR MEASURING DEVICE
Filed Nov. 30, 1949   4 Sheets-Sheet 4
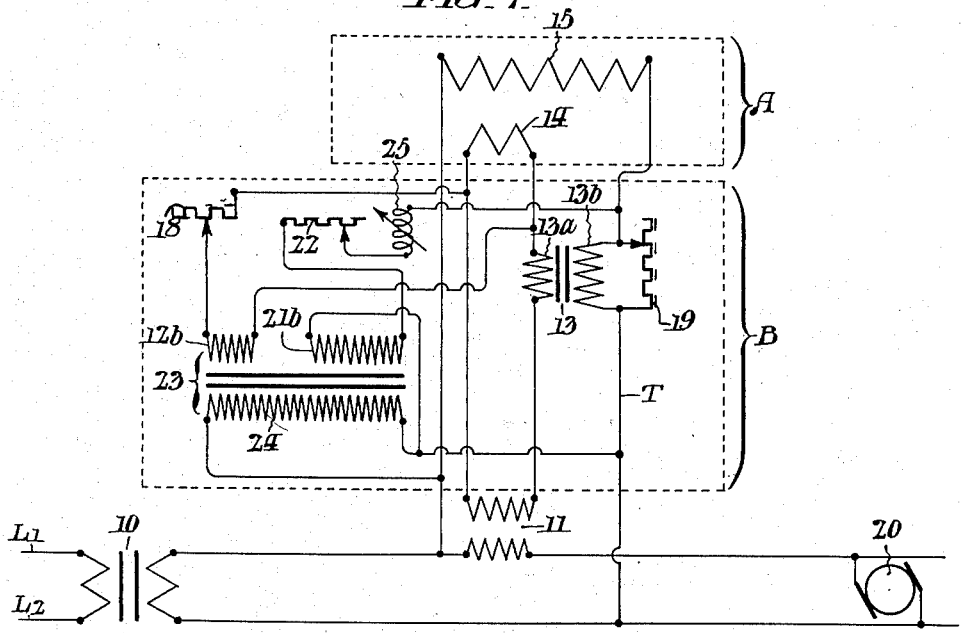
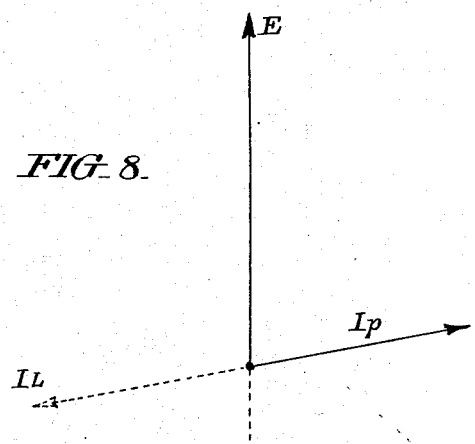
WITNESSES
INVENTOR:
George B. Schleicher.
BY
ATTORNEYS.

Patented June 15, 1954

2,681,436

UNITED STATES PATENT OFFICE 2,681,436

TRANSFORMER-LOSS COMPENSATOR MEASURING DEVICE

George B. Schleicher, Clementon, N. J.

Application November 30, 1949, Serial No. 130,180

9 Claims. (Cl. 324—127)

This invention relates to the art of measuring alternating current energy and particularly to improvements in apparatus for metering alternating current electrical energy and simultaneously compensating for losses in transformers and other associated equipment.

In supplying electrical energy, particularly to industrial loads, electrical utilities frequently furnish such energy at distribution or transmission voltages. In such cases the ultimate customer usually provides the necessary transformer or transformers for stepping down to the utilization voltage. Since it is desired to include the transformer losses in the watt-hour meter registration for billing purposes, the metering equipment is ordinarily placed on the high voltage side of the step-down transformer. However, metering on the low-voltage side is less costly and possesses the further advantage of simplifying the high-voltage construction and at the same time protects the metering equipment from lightning and surge disturbances on the high-voltage side.

One method heretofore employed in an effort to provide a compensating action for such a watt-hour meter includes the use of transformers for adding a copper-loss increment and for adding an iron-loss increment to the registration of the watt-hour meter.

In this prior method a small potential transformer, energized from the low-voltage side of the power transformer whose losses are to be compensated for, has its secondary connected in series with an adjustable resistor and the current coil of the watt-hour meter. The resistor is adjusted so that a current proportional to the iron loss is passed through the meter current coil. The iron-loss registration of the power transformer is thus added to the watt-hour meter registration in accordance with the square of the line voltage.

For adding the copper-loss increment, a small current transformer is connected so that its primary winding receives a current proportional to the line current. An adjustable resistor connected across the secondary of this current transformer provides a voltage proportional to the copper losses of the power transformer. This voltage is introduced as a series component of the voltage supplied to the watt-hour meter potential coil. The copper-loss increment is thus added to the watt-hour meter registration in accordance with the square of the load current.

An error exists in this method of copper-loss measurement in that a compensator properly adjusted for a load power-factor of 1.0, will have errors in registration at lagging power factors. Thus at 0.50 lagging power factor, the error in measuring the copper-loss increment may be as much as 60 per cent of the copper-loss. This error is due largely to the flow of the highly inductive extraneous meter-potential-circuit current through the copper-loss transformer secondary and its adjustable resistor in parallel. One method of improving the performance of the copper-loss element consists of passing through the copper-loss transformer secondary an additional current having a leading component that neutralizes the inductive component of the meter potential coil current so that the combined extraneous current through the copper-loss compensator is a minimum.

The latter method is disclosed in my copending application which bears Serial No. 59,483, filed November 12, 1948 of which this application is a continuation-in-part.

One of the principal objects of the present invention is to provide an improved transformer-copper-loss compensator system which will operate to give substantially correct meter registration even though the power factor of the load may be other than unity and whether it is lagging or leading.

A further object of my present invention is to provide a simplified transformer copper-loss compensator that provides substantially complete compensation for the flow of the meter potential circuit current through the copper-loss compensator, and that will provide accurate compensation for copper-losses at any value of load power factor.

Another object is to provide a transformer-loss compensating system in which the losses inherent in the loss compensating system are a minimum. This is very desirable in watt-hour metering practice, not only because a low burden is imposed on instrument transformers, but it also reduces the continuous energy losses within the device.

Means for attaining the above objects are shown in the accompanying drawings in which Fig. 1 is a diagrammatic representation of a form of the present invention employing a fixed capacitor connected in parallel with the watt-hour meter potential coil.

Fig. 2 is a diagrammatic representation of a form of the present invention employing a potentiometer for adjusting the voltage applied to the capacitor.

Fig. 4 is a vector diagram showing the relationship of the extraneous currents within the compensator, representing the meter potential circuit current $I_p$, the capacitor current $I_c$, the resultant current $I_{p1}$ and a resistor current $-I_{p1}$ such that the resultant extraneous current through the compensator will become zero.

Figure 3:
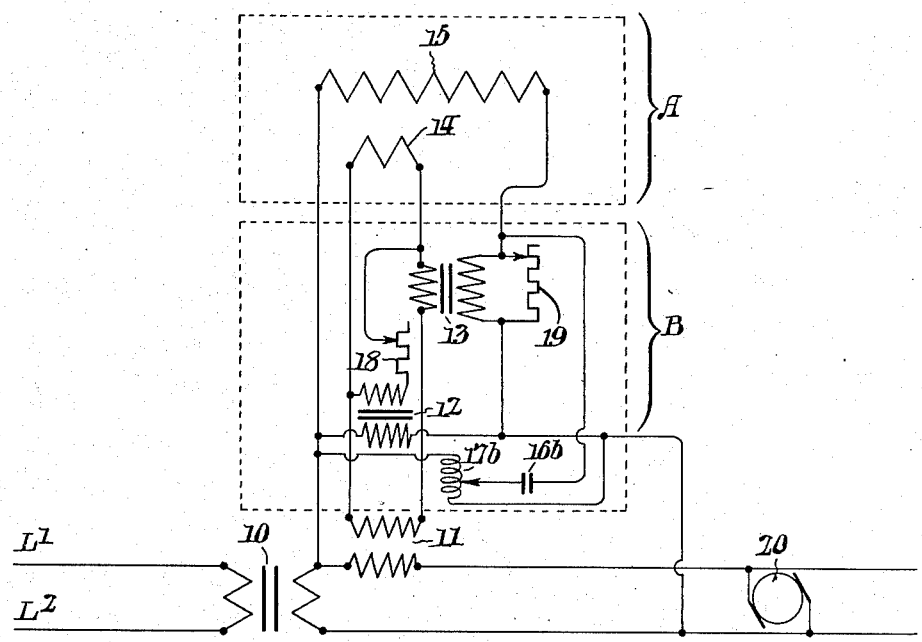
Fig. 3 is a diagrammatic representation of another form of the present invention employing a tapped autotransformer for adjusting the voltage applied to the capacitor.

Fig. 5 is a diagrammatic representation of an embodiment of my invention that provides complete compensation for the extraneous current through the compensator. Separate transformers supply the iron-loss compensation, and a voltage displaced 180° from the supply voltage for the compensating resistor $-I_{p1}$. A separate adjustable autotransformer is shown for supplying the capacitor.

Fig. 6 is a diagrammatic representation of a preferred embodiment of my invention, in which a combination transformer supplies an adjustable voltage for the capacitor by taps on the primary, a voltage displaced by 180° from the line voltage from a secondary coil (or a continuation of the primary winding) for supplying neutralizing current, and the iron-loss compensation current from a low-voltage tertiary.

Fig. 7 is a diagram of an alternative embodiment of my invention in which an adjustable inductor or reactor and an adjustable resistor are connected in series to a voltage that is opposite in direction to the supply voltage.

Fig. 8 is a vector diagram showing the relationship of the extraneous current components through the copper-loss compensator for the connections of Fig. 7.

In the drawings the usual service lines L1 and L2 are shown connected to the primary of power transformer 10 which operates to step down the voltage for supply to the load 20. Watt-hour meter A is provided for metering purposes. Compensator B, hereinafter described in detail, is connected to watt-hour meter A and to the load circuit as shown. Current transformer 11 is included to take care of those cases in which the load of transformer 10 exceeds the capacity of watt-hour meter A. The current coil 14 of watt-hour meter A is connected in series with the secondary of current transformer 11 through the primary of transformer 13. Transformer 12 is used in conjunction with adjustable resistor 18 to provide an increment to be added to the registration of the watt-hour meter which will correspond to the iron-loss of transformer 10. A second incremental registration corresponding to the copper-loss of transformer 10 is added through the operation of transformer 13 and adjustable resistor 19. A correction to neutralize the reactive component current of potential coil 15 in the copper-loss compensator is provided by the insertion of a suitable capacitor 16 across the potential coil 15 of watt-hour meter A. In Figure 1 this is shown as a fixed capacitor 16. In actual practice the embodiments shown in Figure 2 and Figure 3 are preferable since commercial capacitors are not generally available in the exact microfarad rating required for accurate compensation in a given installation. In Figure 2, one side of a capacitor 16a of ample capacitance is connected to a potentiometer 17 which in turn is connected across the secondary of transformer 10 as shown. The capacitor current flows through the copper-loss compensator but not through the meter potential coil 15. The capacity of capacitor 16 is preferably greater than C in the following formula:

$$C = \frac{V_p}{4.98} \times \left(\frac{115}{E}\right)^2$$

Where C equals the desired rating of capacitor 16 in microfarads, $V_p$ equals the vars lagging of potential coil 15 and E equals the nominal voltage of potential coil 15 at 60 cycles.

The above formula is a simplified formula and is based upon an assumed frequency of 60 cycles. The present invention is applicable to currents of any desired frequency and the following formula is applicable for calculation of the desired capacitance for capacitors 16, 16a and 16b.

$$C = \frac{10^6 \times V_p}{2 \pi f E^2}$$

Where C equals the desired rating of the capacitor in microfarads, $V_p$ equals the vars lagging of potential coil 15 (equivalent to the desired leading vars of the capacitor), $f$ equals the frequency of the supply, and E equals the nominal voltage of potential coil 15.

The characteristics of the watt-hour meters commercially available differ considerably, but for a given watt-hour meter the selection of the proper capacitance value for capacitor 16 is possible by reference to the equation set forth above. In the following table the published characteristics for six well known types of watt-hour meters are set forth.

*Potential circuit characteristics of typical watt-hour meters*

| Make | Type | Volts | Amps. | Watts | Vars Lagging |
|---|---|---|---|---|---|
| General Electric | IB-9 | 115 | 0.17 | 2.0 | 19.5 |
| Do | V-3 | 115 | 0.088 | 1.2 | 10 |
| Westinghouse | CA-2 | 115 | 0.074 | 1.7 | 8.3 |
| Duncan | MG | 115 | 0.0595 | 1.10 | 7.75 |
| Sangamo | LC2 | 120 | 0.0617 | 1.10 | 7.3 |
| Do | HF | 120 | 0.0883 | 1.38 | 4.4 |

| Make | Type | Volt Amps. | Percent Power Factor | Resistance, Ohms | Inductance, Henrys |
|---|---|---|---|---|---|
| General Electric | IB-9 | 19.5 | 10.0 | 69 | 1.79 |
| Do | V-3 | 10.1 | 12.0 | 155 | 3.44 |
| Westinghouse | CA-2 | 8.5 | 20.0 | 311 | 4.37 |
| Duncan | MG | 6.85 | 16.1 | 311 | 5.07 |
| Sangamo | LC-2 | 7.4 | 15.0 | 940 | 7.93 |
| Do | HF | 4.6 | 30.0 | 346 | 6.10 |

As an example from the above table a V-3 meter has the following potential circuit characteristics:

Volts _____ 115
Amps. _____ .088
Watts _____ 1.2
Vars lagging _____ 10
Volt amp. _____ 10.1
Cycles _____ 60
Power factor _____ percent__ 12.0
Resistance (ohms) _____ 155
Inductance (henrys) _____ 3.44

Considering first the connections of Fig. 5 or 6 the following calculations may be made to determine the magnitude of the various quantities involved in compensating for the flow of the potential circuit current through the copper-loss compensator:

The cosine of the angle of lag is 0.12 and the angle of lag is approximately 83°6'. Current $I_p$ is 0.088 ampere. The capacitor current is 0.088 sin 83°6' or 0.0875 ampere. This is obtained in Fig. 5 by a 4 mfd. capacitor connected to approximately 55 volts, or in Fig. 6 by a 1.5 mfd. capacitor connected to approximately 150 volts. The remaining extraneous current $I_{p1}$ is equal to $I_p \cos 83°6'$ or 0.01053 ampere. Complete compensation for this extraneous current is attained by adjusting resistor 22 to 115 volts/0.01053 ampere or approximately 10920 ohms. By the connections of Fig. 7 the inductive reactor would be adjusted to 3.44 henrys. The inherent resistance of the reactor will be approximately 60 ohms. The total resistance required is 155 ohms. Hence resistor 22 would be adjusted to 95 ohms.

In the case of General Electric type IB-9 portable watt-hour meter, which has a potential circuit of 19.5 vars lagging, the value of capacitor 16 in a circuit adapted for a load operating at 115 volts would be 3.9 microfarads. At a potential coil voltage of 230 volts the value of capacitor 16 would be about 0.97 microfarad. Similarly for the Westinghouse type CA-2 watt-hour meter, the value of capacitor 16 at 115 volts would be about 1.7 microfarads and at 230 volts would be 0.42 microfarad.

With the connections shown in Fig. 3 a small extraneous current through the copper-loss compensator remains after capacitor 16b is connected in circuit. The principle will be understood by reference to the vector diagram of Fig. 4 in which $I_p$ is the meter potential circuit current, $I_c$ is the capacitor current, and $I_{p1}$ is the remaining component which is in phase with the supply voltage E. By adding a current $(-I_{p1})$ that is equal and opposite to $I_{p1}$ the extraneous current through the compensator is reduced to zero.

The small current that remains after the connection of capacitor 16 is expressed by the formula $I_{p1}=W_p/E$ where $W_p$ is the watts of the meter potential coil and E is the line voltage.

By connecting transformer 21 of Fig. 5 to the supply voltage and its secondary with reversed polarity through resistor 22 and the secondary circuit of copper-loss compensator 13 including adjustable resistor 19, a current equal and opposite to $I_{p1}$ will flow through the copper-loss compensator so that the resultant extraneous current through the copper-loss compensator 13 is zero. The value of resistor 22 is $E^2/W_p$ ohms.

Fig. 6 shows a preferred embodiment of my invention. In the circuit of Fig. 5 the primaries of iron-loss transformer 12, transformer 21, and autotransformer 17b are all energized from the supply voltage. They may therefore be replaced by a single transformer as shown in Fig. 6. Transformer 23 comprises a combination of primary 12a, primary 21a, and autotransformer 17b, of Figs. 3 and 5. Primary 24 has sufficient taps to provide the desired quantity of reactive amperes from capacitor 16 to give the desired value of $I_c$. The secondary 21b or extended primary winding supplies the voltage-E and tertiary 12b supplies the current for the iron-loss compensation through resistor 18. The transformer serves for supply voltages of 115 or 230. It also permits a reduction in the rating of capacitor 16b. Thus, for Fig. 5, a 4 mfd. capacitor is required for the listed types of 115-volt watt-hour meters. For Fig. 6 a capacitor of only 2 mfd. is required because the capacitor may be operated at higher voltage than the meter potential coil. Four 0.5 mfd. capacitors that may be arranged in series-parallel connections, well known in the art, are adequate for present types of 115- or 230-volt meters, as such capacitors provide microfarad ratings from 0.125 to 2.0. For a 230 volt meter the capacitor is operated at a lower voltage than the meter, thus reducing the differential between the capacity required for 115 and 230-volt meters. Thus, for a 115-volt meter the following formula may be used:

$$C=\frac{10^6 \times V_p}{4\pi f E^2}$$

For a 240-volt meter $$C=\frac{10^6 \times V_p}{2\pi f E^2}$$

Where C equals the desired rating of capacitor 16 in microfarads, $V_p$ equals the vars lagging of potential coil 15, based on the maximum vars of any desired watt-hour meter potential coil, $f$ equals the frequency of the supply and E equals the nominal supply voltage for the meter potential coil.

With the voltage $-E$ available, the capacitor connected to voltage E may be replaced by an inductive reactor connected to voltage $-E$. Thus a reactor having identical characteristics of inductance and resistance to the meter potential coil will serve to reduce the extraneous current through the compensator to zero if connected as shown in Fig. 7. In view of the wide variation in characteristics of watt-hour meter potential coils the inductive reactor should have a minimum resistance and should be adjustable for the range of inductance of the various meter potential coils. A resistor in series with the reactor will serve to provide that portion of the required resistance component that is not inherent in the reactor. For purposes of calculation, the required inductance in henrys of the inductor for any meter potential coil is equal to the inductance of the potential coil, or $$L=\frac{V_p}{2\theta f I^2}$$

where $V_p$ = Vars of the meter potential coil
$f$ = Frequency of the circuit
$I$ = Current in amperes of the meter potential coil.

The required resistance of the resistor in series with the inductive reactor is given by:

$$R=R_r-r$$

where $R_r$ = Resistance of meter potential coil
$r$ = Inherent resistance in ohms of the inductive reactor.

Inductive reactor 25 in Fig. 7 would have an inductance range calculated for the potential circuits of meters with the highest and lowest inductance of the types to be used. Its inherent resistance should be less than the resistance of the watt-hour meter potential coil having the lowest resistance.

Having described my invention by reference to the accompanying drawings and in terms of typical watt-hour meters, I will now provide specific examples setting forth characteristics for the various components sufficient to enable those skilled in the art to practice the present invention.

| Item | Example 1, Figs. 2 and 3 | Example 2, Figs. 2 and 3 |
|---|---|---|
| Low voltage supply | 115 volts, 1φ | 230 volts, 1φ. |
| Load Transformer 10 | 25 kva | same. |
| Current Transformer 11 | 200:5 amps | 100:5 amps. |
| Transformer 12, 12b | 115:3 volts | 230:3 volts. |
| Transformer 13 | 5.0:0.5 amp | same. |
| Current Coil 14 | 5 amp | same. |
| Potential Coil 15 | 115 volts | 230 volts. |
| Capacitor 16a | 4 mf | 1 mf. |
| Potentiometer 17 or Autotransformer 17b | 200 ohms; 115 volts, 0.2 amp. | 400 ohms; 230 volts, 0.1 amp. |
| Resistor 18 | 3 to 250 ohms | same. |
| Resistor 19 | 0 to 25 ohms | 0 to 50 ohms. |

| Item | Example 3, Fig. 5 | Example 4, Fig. 6 | Example 5, Fig. 7 |
|---|---|---|---|
| Low voltage supply | 115 volts, 1φ | Same | Same. |
| Load Transformer 10 | 25 kva | Same | Same. |
| Current Transformer 11 | 200:5 amps | Same | Same. |
| Transformer 12, 12b | 115:3 volts | | |
| Transformer 13 | 5.0:0.25 amps | Same | Same. |
| Current Coil 14 | 5 amp | Same | Same. |
| Coil 15 | 115 volts | Same | Same. |
| Capacitor 16 | 4.0 mf | 2.0 mf | |
| Autotransformer 17b | 115 volts, 0.2 amp | | |
| Resistor 18 | 3 to 500 ohms | Same | Same. |
| Resistor 19 | 0 to 50 ohms | Same | Same. |
| Transformer 23 | | 115/230 volts tapped every 10 volts—from left, every 1 volt for first ten volts from 0. | Tapped 230, 115, 0,—115 volts. |
| Primary 24 | | 115 volts | |
| Secondary 21b | | 3 volts | 3 volts. |
| Tertiary 12b | | 4,000 to 30,000 ohms | 0 to 1,000 ohms. |
| Resistor 22 (ohms) | 2,000 to 15,000 ohms | | 1.7 to 12.2. |
| Inductive Reactor (25) | inductance (henrys) | | 60. |
| Inherent | resistance (ohms) | | |

In the application of the device it is not necessary to calculate the values of capacitor 16, 16a or 16b, nor to measure the potential circuit current of the meter, nor to determine the phase relation of the potential circuit through the compensator. In practice the calculation of the losses in percent of load are well known in the art, and these are determined for the load values at which it is desired to test the meter. Thus, having the meter properly calibrated as a watt-hour meter, it would then be connected to the compensator; resistor 19 would be adjusted until the meter reads the desired copper loss increment at power factor 1.00. For inductive load performance, by a test at, for example, 0.50 power factor lagging, potentiometer 17 or autotransformer 23 would be adjusted until the meter reads the desired performance of power factor 0.50.

In practice a low-reading watt-meter may have its current coils connected into the circuit at T Figs. 5, 6 and 7 and potential for the watt-meter is supplied through a double throw switch, whereby the potential may be displaced so it is either in phase with the line voltage to obtain a wattage reading, or displaced 90° from the line voltage to measure vars. When the potential is displaced 90° from the line voltage, autotransformer 23, the taps on winding 24, or the inductive reactor 25 are adjusted until the watt-meter reads zero vars. This is the permanent setting of these devices for use with the particular meter A. The watt-meter at T is then connected so as to measure watts and resistor 22 is adjusted until the watt reading is zero. This is the permanent adjustment of resistor 22 for the particular meter A. The test watt-meter is then removed from the circuit.

The adjustment of resistors 18 and 19 is based on predetermined no load and copper losses for the particular load transformer 10. When load 20 is removed from the circuit, a current still flows through coil 14 and this current depends on the adjustment of resistor 18 whose adjustment causes the meter to indicate a load equal to the no-load losses of transformer 10. This is the permanent setting of resistor 18 for use in the compensation for losses of the particular transformer in the circuit.

Resistor 19 is similarly adjusted to compensate for the predetermined copper losses of the transformer by operating the meter at full-load current and setting resistor 19 so that the meter registers the load plus the corresponding load losses of the transformer. This is the permanent setting of resistor 19 for the particular transformer then in the circuit.

In metering practice it is important to keep the secondary burden on current transformers low. To accomplish this the ratio of transformer 13 should be as high as possible. Meter potential circuit currents usually range from about 0.1 to about 0.2 ampere and with the complete compensation for the potential circuit current made available by this invention a ratio as high as 5 amperes to 0.25 ampere (20:1) is practical for transformer 13. In the case of a 0.25 ampere secondary for transformer 13 adjustable resistor 19 may have a range from zero to 50 ohms, which would give a maximum range of adjustment for copper-loss of about 10% for a 115 volt watt-hour meter. The usual adjustment would be from 1 to 2% in the case where no long transmission line is included.

For transformer 23, it is not necessary that the secondary voltage —E be exact. It may be higher or lower than the supply voltage E provided that suitable adjustments are made in the values of resistance, capacitance or inductance. Advantage is taken of this fact in the diagrams by using a 115-volt winding for both 115-volt and 230-volt meters. For 230-volt meters the required values of resistance, capacitance or inductance are one-half of the values calculated on the basis of the characteristics of 230-volt potential coils.

The outstanding characteristic of the invention as described above is that it will provide substantially accurate compensation for a watt-hour meter even though the power factor of the load departs from unity. While it is not intended to limit the present invention by reference to any theoretical explanation, it is considered that the current of capacitor 16, 16a and 16b is acting in such a way as to neutralize the reactive component of the watt-hour meter potential coil current within the copper-loss compensator circuit; similarly the current through resistor 22 neutralizes the active component of the meter potential coil current so that the combined extraneous current through the copper-loss compensator is zero. This is accomplished without changing the phase relation of the potential coil current within the watt-hour meter A. This relationship is maintained even though the load power factor changes, provided the proper initial adjustments have been made of the voltage across capacitor 16 or 16a and the values of adjustable resistors 18, 19 and 22. Once these adjustments have been made no further changes are required so long as the system operates at the given nominal voltage, with the same power transformer 10, and with the particular watt-hour meter for which the adjustment has been made.

It will be apparent to those skilled in the art, that the method is not limited to use on nominal line voltages of 115 or 230. For higher voltages a potential transformer may be interposed between the secondary line voltage and the potential circuits of the watt-hour meter and compensator. For example, if transformer 10 were rated 69,000 to 13,800 volts, the watt-hour meter and compensator would be connected to the secondary of a 13,800:115 volt potential transformer.

The application of the compensator is not limited to a watt-hour meter alone. The watt-hour meter may be used with any of the accessories that are well known in the art, such as watt-hour demand meters, either indicating, cumulative, or graphic, or the watt-hour meter may be equipped with contacts or photoelectric means for operating a separate demand meter or telemetering equipment.

It will be apparent also to those skilled in the art that a compensator may be adjusted for var losses of iron and copper losses and used with a watt-hour meter connected to an autotransformer for causing the watt-hour meter to register var hours. Such autotransformers are well known in the art.

While the description pertains to compensation for single-phase circuits, it is apparent that duplicates of the compensator may be used for the complete measurement of polyphase circuits with multi-elements meters: or a single-phase compensator may be installed on one phase of a balanced polyphase circuit and adjusted for the total losses.

On polyphase circuits it is practical also to use in the compensator a single iron-loss element 12 and 18 and as many copper loss elements 13, 16, 17 and 19 as there are elements in the polyphase watt-hour meter used on the circuit to be metered. Thus a two element meter would be used with a compensator having one iron-loss element and two copper-loss elements, and for a three element meter one iron-loss element and three copper-loss elements would be used.

It is apparent also that the compensator of the present invention may be connected to subtract the transformer losses instead of add. Thus the compensator may be connected to metering on the input side of a transformer to measure the energy supplied on the output side.

Each of the individual steps cited herein in the development of my method for reducing the extraneous current through the copper-loss compensator to zero, produces an improvement in the loss compensation as included in the watt-hour meter registration. Thus, where extreme accuracy is not required, partial compensation may be practical.

It will further be apparent to persons skilled in the art that a countercurrent may be introduced into the potential circuit of the compensator in numerous ways other than the preferred methods shown in the drawings and that the amplitude and phase angle of the current introduced may otherwise be regulated to attain a resultant current of substantially zero in the potential circuit. Multiples of the compensator units described may be provided for the complete measurement and loss compensation of polyphase circuits, and when so applied the connections shown are independent of phase sequence.

While I have described my invention by reference to specific examples which include designations as to the electrical characteristics of the various components, I do not intend to limit the scope of my invention to the specific description or to the examples. It will be apparent that various changes can be made and that equivalent circuits and components will suggest themselves to those skilled in the art. It is therefore intended that all such equivalents shall be treated as a part of my invention as hereinafter claimed.

Having thus described my invention, I claim:

1. In a device for measuring alternating current energy, the combination of a watt-hour meter and a compensator, said watt-hour meter having a current coil and a potential coil, the constants of said potential coil being such as to produce a highly inductive current when connected to an alternating voltage source, a copper-loss transformer having its primary connected in series with said current coil and having its secondary and an adjustable resistor in parallel therewith connected in series with said potential coil, an autotransformer connected across said voltage source and a capacitor connected across the output of said autotransformer through the secondary of said copper-loss transformer and its adjustable resistor, a second alternating voltage displaced 180° from and of the same frequency as said first mentioned voltage source, an adjustable resistor connected to said second voltage source in series with the secondary of said copper-loss transformer and the associated adjustable resistor in parallel therewith whereby the effect of passing the meter potential coil current through the copper-loss transformer secondary and its associated adjustable resistor is substantially neutralized.

2. In a device for measuring alternating current energy, the combination of a watt-hour meter and a compensator, said watt-hour meter having a current coil and a potential coil the constants of said potential coil being such as to produce a highly inductive current when connected to an alternating voltage source, a copper-loss transformer having its primary connected in series with said current coil and having its secondary and an adjustable resistor in parallel therewith connected in series with said potential coil, a transformer having a primary connected across said voltage source, a capacitor connected to taps on said primary and in series with the secondary of said copper loss transformer and the associated resistor in parallel therewith, and a resistor connected in series with said copper loss transformer secondary and the associated adjustable resistor in parallel therewith to a secondary of reversed polarity on said transformer, and a tertiary winding on said transformer connected in series with an adjustable resistor across the current coil of said meter.

3. In a device for measuring alternating current energy, the combination of a watt-hour meter and a compensator, said watt-hour meter having a current coil and a potential coil adapted to be energized from an alternating voltage source, a copper-loss transformer having its primary connected in series with said current coil and having its secondary and an adjustable resistor in parallel therewith connected in series with said potential coil, and means energized from said voltage source for applying through the parallel combination of said copper-loss transformer secondary and said adjustable resistor current for neutralizing the effect of passing the meter potential coil current through the copper-loss transformer secondary and said adjustable resistor.

4. In a device for measuring alternating current energy, the combination of a watt-hour meter and compensator, said watt-hour meter having a current coil and a potential coil adapted to be energized from an alternating voltage source, a copper-loss transformer having its primary connected in series with said current coil and having its secondary and an adjustable resistor in parallel therewith connected in series with said potential coil, and means energized from said voltage source for applying through the parallel combination of said copper-loss transformer secondary and said adjustable resistor a leading current for neutralizing the inductive components of the meter potential coil current passing through the copper-loss transformer secondary and said adjustable resistor.

5. The invention of claim 4 further characterized by the fact that said current providing means comprises a capacitor.

6. The invention of claim 3 further characterized by the fact that said current applying means includes an adjustable autotransformer connected across said voltage source and a capacitor connected across the output of said autotransformer in series with the secondary of said copper-loss transformer and the associated adjustable resistor in parallel therewith.

7. The invention of claim 3 further characterized by the fact that said current applying means comprises the series combination of an adjustable inductive reactor, a second adjustable resistor and a source of alternating voltage supply displaced 180° from and of the same frequency as said first mentioned voltage source, connected across said copper-loss transformer and the associated adjustable resistor in parallel therewith.

8. The invention of claim 3 further characterized by the fact that said current applying means includes an autotransformer and the primary of a second transformer connected in parallel across said voltage source, and that there is connected across said copper-loss transformer and said associated adjustable resistor in parallel therewith a parallel circuit one branch of which comprises the secondary of said second transformer in series with a second adjustable resistor and the other branch comprises a portion of said autotransformer in series with a capacitor.

9. The invention of claim 3 further characterized by the fact that said current applying means includes a second transformer having a primary connected across said voltage source, and a secondary of reversed polarity in respect to said primary to which is connected an inductive reactor in series with an adjustable resistor and said secondary of said copper-loss transformer and the associated resistor in parallel therewith, and having a tertiary winding across which is connected said current coil of said watt-hour meter in series with an adjustable resistor.

References Cited in the file of this patent

UNITED STATES PATENTS

| Number | Name | Date |
| --- | --- | --- |
| 940,747 | Sumpner | Nov. 23, 1909 |
| 1,129,231 | Robinson et al. | Feb. 23, 1915 |
| 1,942,193 | Szilas et al. | Jan. 2, 1933 |
| 2,130,842 | Harder | Sept. 20, 1938 |
| 2,154,270 | Harder | Apr. 11, 1939 |